(12) United States Patent
Bandi

(10) Patent No.: US 6,644,065 B2
(45) Date of Patent: Nov. 11, 2003

(54) ACCUMULATOR DEHYDRATOR FOR COOLING CIRCUITS WITH A SIMPLIFIED STRUCTURE

(75) Inventor: Mauro Bandi, Vigevano (IT)

(73) Assignee: Ti Automotive Cisliano S.r.l., Cisliano (IT)

(*) Notice: Subject to any disclaimer, the term of this patent is extended or adjusted under 35 U.S.C. 154(b) by 0 days.

(21) Appl. No.: 10/316,499

(22) Filed: Dec. 11, 2002

(65) Prior Publication Data

US 2003/0110792 A1 Jun. 19, 2003

(30) Foreign Application Priority Data

Dec. 14, 2001 (IT) ..................... MI2001U0655

(51) Int. Cl.[7] .............................. F25B 43/00
(52) U.S. Cl. ......................... 62/474; 62/503
(58) Field of Search .................... 62/474, 503

(56) References Cited

U.S. PATENT DOCUMENTS

| | | | |
|---|---|---|---|
| 5,651,266 A | * | 7/1997 | Hutchison et al. ............ 62/474 |
| 5,746,065 A | * | 5/1998 | Patel et al. .................... 62/503 |
| 5,787,729 A | * | 8/1998 | Wijaya ......................... 62/503 |
| 5,802,868 A | * | 9/1998 | Riemenschneider ......... 62/474 |
| 5,970,738 A | * | 10/1999 | DeNolf et al. ................. 62/474 |
| 5,996,371 A | * | 12/1999 | Riemenschneider ......... 62/474 |
| 6,167,720 B1 | * | 1/2001 | Chisnell ....................... 62/474 |
| 6,318,116 B1 | * | 11/2001 | Gabel et al. .................. 62/475 |
| 6,385,994 B2 | * | 5/2002 | Schroeder et al. ........... 62/503 |
| 6,389,842 B1 | * | 5/2002 | Telesz et al. ................. 62/503 |
| 6,430,958 B1 | * | 8/2002 | Corrigan et al. ............. 62/503 |
| 6,438,972 B1 | * | 8/2002 | Pickett, Jr. et al. ........... 62/85 |
| 6,481,241 B1 | * | 11/2002 | Fisk et al. ..................... 62/503 |

* cited by examiner

Primary Examiner—William C. Doerrler
Assistant Examiner—Mark S. Shulman
(74) Attorney, Agent, or Firm—Hedman & Costigan, P.C.

(57) ABSTRACT

An accumulator dehydrator for cooling circuits with a simplified structure comprising a hollow outer casing (12), cylindrical in shape, provided with a base (13) with a raised thickness, in which an inlet hole (14) and an outlet hole (16) are produced, said hollow outer casing (12) containing a filter element (22), a desiccant bag (31), a U-shaped tube and a diffuser element, in which the U-shaped tube, the filter element and the diffuser element are produced in a single moulded piece (19, 20, 22).

7 Claims, 2 Drawing Sheets

ACCUMULATOR DEHYDRATOR FOR COOLING CIRCUITS WITH A SIMPLIFIED STRUCTURE

The present invention relates to an accumulator dehydrator for cooling circuits with a simplified structure.

Accumulators are used in air conditioning and/or cooling systems to separate moisture, found in the refrigerant, and simultaneously permit the correct circulation of lubricating oil.

The structure of these accumulators is obtained by combining a certain number of parts or components. In this way a complex construction is obtained, in several parts, which causes a certain number of problems regarding both correct assembly and cost. It is also evident that the presence of a considerable number of parts causes problems regarding correct seal between the parts, problems which multiply as the number of parts increases.

A type of accumulator dehydrator which partly solves these problems was proposed in the Italian patent application MI99A822 of 20 Apr. 1999 currently the property of the present applicant.

The general object of the present invention is to further improve the structure of this accumulator dehydrator for cooling circuits.

Another object of the present invention is undoubtedly to solve the problems mentioned in the introductory part relative to the state of the art.

Yet another object of the present invention is to produce an accumulator dehydrator which is extremely simple to assemble.

A further object of the present invention is to produce an accumulator which in any case guarantees a lasting correct seal.

These objects according to the present invention are attained by producing an accumulator dehydrator for cooling circuits with a simplified structure as claimed in claim 1.

Further characteristics of the present invention are set forth in the dependent claims.

The characteristics and advantages of an accumulator dehydrator for cooling circuits with a simplified structure according to the invention shall become more evident and clear from the following non-limiting and exemplificative description, with reference to the schematic drawings appended, in which.

With reference to the figures, an accumulator dehydrator 11 for cooling circuits with a simplified structure according to the invention is shown.

Figure 1:
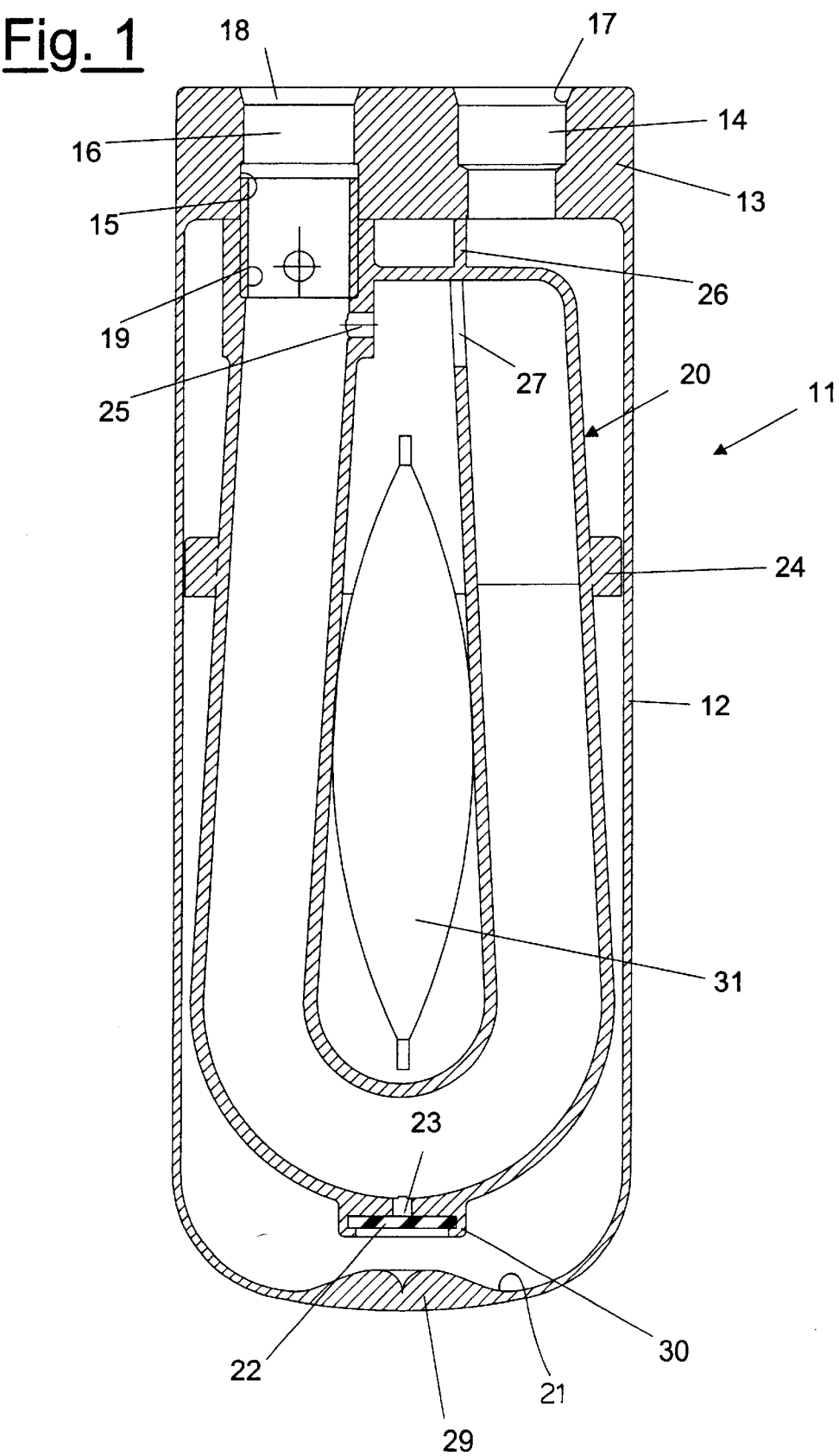
FIG. 1 is a cross-section of an accumulator dehydrator for cooling circuits according to the present invention.
Figure 2:
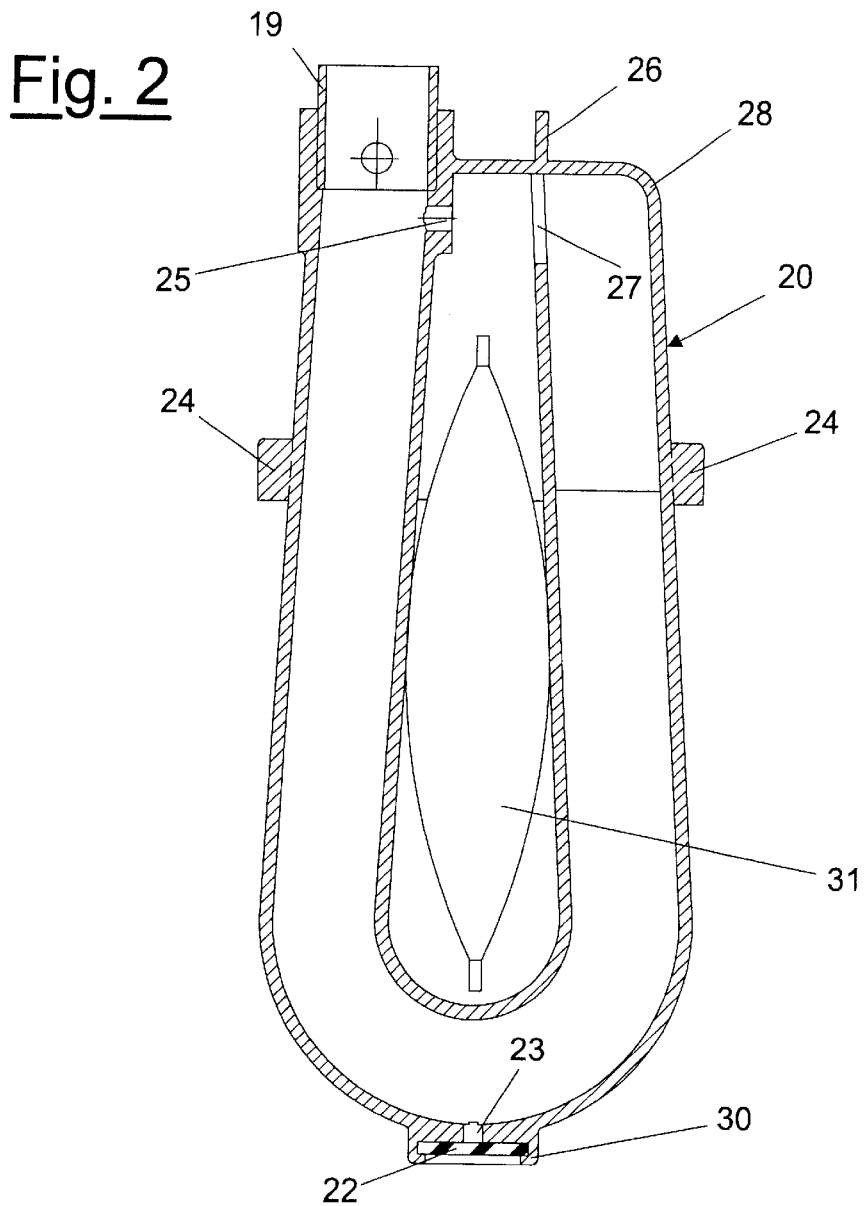
FIG. 2 is a sectional view of an inner part of the accumulator shown in FIG. 3 according to the line II—II.
Figure 3:
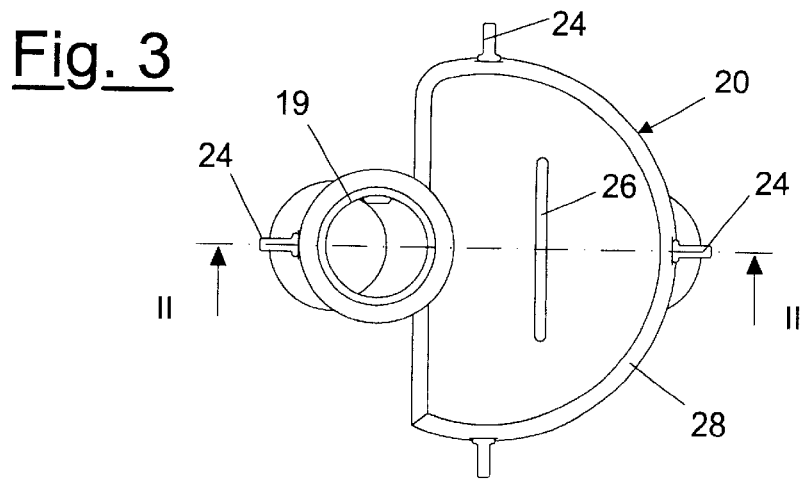
FIG. 3 is a top view of the portion shown in FIG. 2.

FIG. 1 shows how this accumulator dehydrator 11 comprises a hollow outer casing 12, cylindrical in form, a base 13 of which is provided with a raised thickness, all produced for example in aluminium. The base 13 has an inlet hole 14 and an outlet hole 16. These two holes 14 and 16 may have shaped mouths 17 and 18, facing outwards, to receive inlet and outlet tubes (not shown). The outlet hole 16, in its inward facing end, receives in a lowered zone 15 a tubular aluminium insert 19 disposed at the end of a U-shaped tubular element 20.

This U-shaped tubular element 20 extends inside the casing 12 towards a base 21 and then travels along a good part of the casing 12.

The aluminium insert 19 is positioned stably in relation to the tubular element 20, both being moulded in a single piece by overmoulding together with a filter insert 22.

In fact, the tubular element 20 is made integral, in the vicinity of a lower zone of it, with this filter insert 22, for example of plastic, disposed in an enlarged recessed portion 30 in the vicinity of a lower outlet hole 23. The filter insert 22, for example of plastic material, filters impurities, such as dust or other particles, present in the oil which comes to rest on the bottom of the casing. A desiccant element 31 is also provided.

The tubular element 20 is also of plastic material and its sides are provided with stable positioning tabs 24 for centring, which project radially outwards and are suitable to abut on the inner wall of the casing 12. This same tubular element 20 abuts on the base 13 on account of the presence of a further upper spacing element 26 specifically provided and produced integrally.

In the vicinity of the end of the tubular element 20 a hole 25 is also provided to collect supplementary oil.

The end of the tubular element 20 opposite the one at which the aluminium insert 19 is positioned has an outlet 27 which leads into the casing 12.

It is extremely important to emphasize how this end has a portion 28, closed and radiused towards the outlet 27 which acts as a diffuser element capable of determining optimal distribution with a certain degree of turbulence of the refrigerant, containing lubricating oil, inflowing through the inlet hole 14.

It must then be noted that the accumulator dehydrator 11 of the present invention in a single tubular element 20 provides the U-shaped tube, the diffuser and the filter element.

It is thus possible to eliminate a certain number of separate parts between which problems of seal were possible. Moreover, their assembly is also eliminated as the composite piece is obtained directly by moulding and overmoulding.

Moreover, the lower end of the outer cylindrical casing 12, originally open, is closed by subjecting a terminal portion of it to a spinning operation. This operation permanently forms the material of which the wall of the outer cylindrical casing 12 is composed and determines the rounded wall 29 stably closed and sealed.

The advantageous final structure of an accumulator dehydrator which is perfectly sealed in relation to the outside and which has a truly minimal number of components, thus becomes evident.

As mentioned before, it has been possible to eliminate, by means of the tubular element 20, the U-shaped tube, the diffuser and the filter element.

This eliminates difficult connection and assembly operations, solving the problems of seal between the parts, which exist in a single piece in the present invention.

What is claimed is:

1. An accumulator dehydrator for cooling circuits with a simplified structure comprising a hollow outer casing (12), cylindrical in shape, provided with a base (13) with a raised thickness, in which an inlet hole (14) and an outlet hole (16) are produced, said hollow outer casing (12) containing a filter element (22), a desiccant bag (31), a U-shaped tube and a diffuser element, characterized in that said U-shaped tube, said filter element and said diffuser element are produced in a single moulded piece (19, 20, 22).

2. An accumulator dehydrator as claimed in claim 1, characterized in that said filter element (22) is disposed in an enlarged recessed portion (30) produced in the lower zone of a tubular element (20).

3. An accumulator dehydrator as claimed in claim 2, characterized in that said tubular element (20) in a first end disposed in said outlet hole (16) has a tubular aluminium insert (19) overmoulded.

4. An accumulator dehydrator as claimed in claim 3, characterized in that the end of said tubular element (20) opposite the one at which the aluminium insert (19) is positioned has an outlet (27) which leads into said casing (12) facing towards said first end.

5. An accumulator dehydrator as claimed in claim 4, characterized in that said outlet (27) is disposed under a portion (28), closed and radiused which acts as a diffuser element capable of determining optimal distribution with a certain degree of turbulence of the refrigerant, containing lubricating oil, inflowing through the inlet hole (14).

6. An accumulator dehydrator as claimed in claim 2, characterized in that said tubular element (20) is moulded in plastic material and is provided with centring side tabs (24), which project outwards and are suitable to abut on the inner wall of said casing (12), and at least one upper spacing element (26) which abuts on the inside of said base (13).

7. An accumulator dehydrator as claimed in claim 1, characterized in that said casing (12) has a stably closed wall (29) produced through a spinning operation on an initially open terminal portion of said casing (12).

* * * * *